United States Patent [19]

Penman

[11] 4,006,514
[45] Feb. 8, 1977

[54] FOLDING FILLETING TOOL

[76] Inventor: Melvin C. Penman, 560 Heim Road, Getzville, N.Y. 14068

[22] Filed: July 10, 1975

[21] Appl. No.: 594,587

[52] U.S. Cl. .................................. 17/68; 30/161
[51] Int. Cl.² ..................................... A22C 25/00
[58] Field of Search ............ 17/66, 68, 69; 30/149, 30/142, 161, 286, 289

[56] References Cited

UNITED STATES PATENTS

| | | | |
|---|---|---|---|
| 1,362,143 | 12/1920 | Rohrer | 17/68 |
| 1,444,324 | 2/1923 | Brooks | 30/161 |
| 2,728,984 | 1/1956 | Hopta | 30/161 |
| 3,290,720 | 12/1966 | Gordon | 17/69 |
| 3,672,002 | 6/1972 | Penman | 17/66 |
| 3,820,196 | 6/1974 | Penman | 17/66 |

FOREIGN PATENTS OR APPLICATIONS

| | | | |
|---|---|---|---|
| 416,366 | 9/1934 | United Kingdom | 17/69 |

*Primary Examiner*—Louis G. Mancene
*Assistant Examiner*—James D. Hamilton
*Attorney, Agent, or Firm*—E. Herbert Liss

[57] ABSTRACT

A dual purpose blade and a shield are pivotally supported on a transverse axis on a hollow handle for pivotal movement from a nested position within the handle to a fully open position at an obtuse angle to the handle. The shield is independently movable relative to the blade. One longitudinal edge of the blade is an extremely sharp cutting edge, the other longitudinal edge being a scraping edge. The free end of the shield when disposed in nested relation with the blade forms a concave curvature at its free end to conform to the shape of a rib cage of a fish. The lateral surface of the combined shield and blade is a smooth concavity having its axis in a direction parallel to the longitudinal axis of the blade. The concavity at the free end of the shield has sharp edges at its junctions with the lateral surfaces of the shield to provide a scraping edge to shear the fish meat from the rib cage.

5 Claims, 8 Drawing Figures

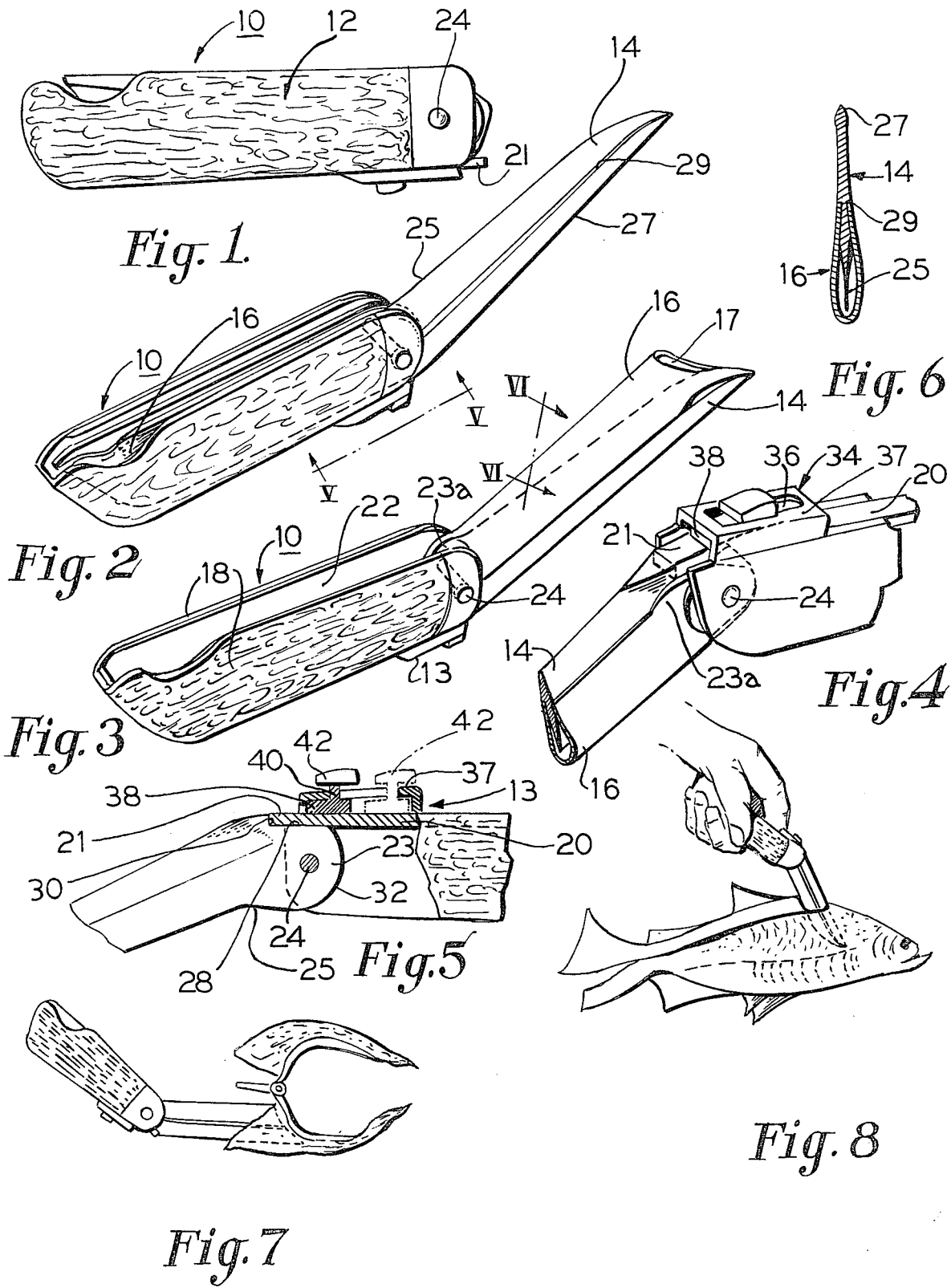

FOLDING FILLETING TOOL

BACKGROUND OF THE INVENTION

The invention relates to a foldable, self-contained pocket tool for filleting fish and more particularly to a pocket tool for incising fish and for removing the meat from the skin and bones. Generally a fillet is obtained by first scaling the fish and then using a sharp knife of a conventional type to carefully remove the fillet from the bone, sometimes leaving the skin and sometimes carefully removing the skin. This process is time consuming and requires considerable skill in order to avoid waste of fish meat. There are also a number of devices used for commercial purposes which comprise complex machinery not constructed for portability. A pocket knife is shown in U.S. Pat. No. 1,362,143 issued to D. Rohrer on Dec. 14, 1920 in which a pivoting cam lever is provided as a lock controlling element. The blade nests within the cam lever. An edge of the cam lever is serrated for fish scaling purposes; however, the device disclosed in Rohrer lacks a means for removing the meat from the skin and bones. Furthermore, the cam lever 14 is not intended to function as a shield for the sharp cutting edge. The cam lever is formed with serrations 15 considerably deeper than the thickness of the sheet metal so that the edge of the blade is exposed through the series of openings formed by the serrations. A filleting tool for removal of the meat from the skin and bones is disclosed in U.S. Pat. No. 3,672,002 issued June 27, 1972 to Melvin C. Penman. The Penman patent functions to provide an excellent means of filleting fish. However, it is not a completely self-contained tool. A separate sharp knife is required for incising the fish. None of the known prior art discloses a self-contained, combined incising and filleting tool which is foldable and provides a shield for the cutting edge while the scraping edge is in use and in which the shield in combination with the scraping edge enhances the shearing operation for separating the meat from the skin and bones of the fish.

SUMMARY OF THE INVENTION

In accordance with the present invention a skinless, boneless fillet can be obtained in a simplified and effective manner by use of a unique, portable, foldable pocket tool. A blade and shield are pivotable from a safe, nested position within the tool handle to a position at an obtuse angle to the handle. The shield is spring urged into frictional engagement with the lateral surfaces of the blade so that when the latching means is released the blade and shield move together. A sharp cutting edge along one longitudinal edge of the blade is safely covered at all times to prevent accidental injury except when it is deliberately exposed for use. To use the cutting edge, the shield can be disengaged from the blade and independently pivoted into the handle. The sharp cutting edge is used to incise the fish to provide an entrance for the scraping device. A scraping edge on the other longitudinal edge of the blade in combination with the shield form a scraper for separating the meat of a fish from its skin and bones. When the blade is nested in the shield the slightly concave lateral surfaces are formed to enhance the plow-like scraping action. The scraper is inserted into the incision. The free end of the combined tool is concave to conform to the curvature of the rib cage and has relatively sharp edges at its junction with the lateral surfaces to assist in shearing the meat from the rib cage. The obtuse angle between the handle and the blade provides a biomechanical advantage. When the fish is placed on a flat surface the scraping edge can fully engage the inner surface of the skin through the meat while the handle extends at an angle which permits efficient co-operation with the muscles of the hand. This arrangement also provides clearance for conveniently grasping the handle. The ordinary knife used for this purpose where the handle and blade are in alignment so that when the blade lies flat the handle lies flat against the surface is awkward to control and difficult to grasp. The blade of the present invention is locked when in open position against angular movement in either direction.

The principal object of the present invention is to provide a safe, economical, self-contained portable hand tool for simplified removal of fish fillets from the skin and bones.

Another object of the invention is to provide a safe, foldable pocket tool wherein the sharp cutting edge is shielded at all times and the shield in co-operation with the blade, provides an efficient scraping device which utilizes a plow-like action to remove a fillet from a fish.

A further object of the invention is to provide a safe, portable self-contained fish filleting tool which is convenient, simple to use and bio-mechanically efficient.

Other objects and advantages of the invention will be apparent from the following detailed description taken in connection with the accompanying drawings.

BRIEF DESCRIPTION OF THE DRAWINGS

FIG. 1 is a side elevational view of the knife in closed, secured position;

FIG. 2 is a perspective view of the knife with the blade extended and the shield nested in the handle;

FIG. 3 is a view similar to FIG. 2 with the blade nested in the shield in full open position;

FIG. 4 is a partial diagramatic view in perspective of the latch and blade structure;

FIG. 5 is a partial sectional view taken on line V—V of FIG. 2;

FIG. 6 is a sectional view taken on line VI—VI of FIG. 3 looking in the direction of the arrows;

FIG. 7 is a diagramatic view illustrating the scraping function of the tool of this invention; and FIG. 8 is a diagramatic view illustrating an incising function of the tool of this invention.

DESCRIPTION OF THE PREFERRED EMBODIMENT

In FIGS. 1 to 6 there is shown a filleting tool 10 having a hollow handle 12. A blade 14 and a shield 16 are pivotally connected at one end about a transverse axis adjacent one end of the handle 12. A latch assembly 13 is provided to retain the blade in either open or nested position.

The handle comprises a pair of side walls 18 transversely spaced apart by a spring bar 20 disposed intermediate the side walls 18 along one longitudinal edge and it extends laterally between the walls along one end. The spring bar 20 has a yieldable end 21 protruding forwardly from the handle 12. This construction forms a recess 22 between the side walls 18 which is open at its forward end. Disposed between the side walls 18 at the open forward end are the tangs 23 and 23a of the blade 14 and shield 16 respectively pivotally mounted on a pin 24 extending transversely between the side walls 18. The spring bar 20 is preferably of resilient material, as for example spring steel.

The shield 16 is substantially U-shaped in cross section. At its tang end 23a the distance between the side walls of the shield is slightly greater than along the remainder of its length to receive the tang 23 of the blade 14 therebetween. At its free end 17 the shield 16 is of a concave curvature, conforming generally to a portion of the rib cage of a fish. The internal spacing between the side walls of the shield 16 are spaced apart a distance so as to frictionally engage the lateral surfaces of the blade 14 and are stressed so as to be spring urged into frictional engagement therewith. The free end 17 of the shield is ground to provide sharp corners at the junction with the outer lateral surfaces of its side walls. These sharp edges provide good scraping edges to assist in separating the fillet from the rib cage of the fish.

The blade 14 tapers to a point at its free end and is sharpened along one longitudinal edge to an extremely sharp cutting edge 25. Along its other longitudinal edge it tapers to a scraping edge 27 which is blunt relative to the sharp cutting edge but is sharp enough to remove the meat from the skin of the fish without cutting the skin or bones. Intermediate its longitudinal edges a longitudinal shoulder 29 is formed intermediate the extremely sharp cutting edge 25 and the scraping edge 27 facing the cutting edge 25. This shoulder 29 serves as a stop to position the shield when the blade 14 is nested between the side walls of the shield 16.

The tang 23 of blade 14 is apertured to receive rivet or pin 24 which serves as a pivotal axis for the blade. The tang 23 is lodged at the forward end of recess 22 between opposed side walls 18; it is formed to provide a longitudinal back edge 28 disposed at an obtuse angle to the cutting edge 26 of the blade and is terminated at its forward end by a stop shoulder 30 at substantially a right angle to the back edge 28. The rear and lower edge 32 is formed to provide a cam-like surface. When the knife blade 14 is outswung to extend from the handle into position of use the yieldable end 21 of spring bar 20 tensionally bears upon the back edge 28 of the tang 23 with the stop shoulder 30 of the tang 23 abutting the end of the spring arm 20 whereby the knife blade 14 is yieldably held in extended position. When the knife blade 14 is folded into recess 18 disposed in a closed, out-of-service position within the handle (FIG. 1), the co-operating spring arm 20 tensionally bears upon the curved rear edge 32 of the tang 23 whereby the knife blade is yieldably held in such closed position (FIGS. 2, 3, and 4). When the knife blade 14 is swung about the pin 24 to either extend it to open or to closed position, the rear edge 32 of the tang 23 cams against the yieldable end 21 of spring arm 20 and by its thrust causes the latter to flex outwardly so as to yield to the swinging movement of the blade.

Latching means 13 functions to prevent the spring end 21 from yielding, thereby preventing pivotal movement of the blade 14 in open or closed position. At the forward end of the handle overlying the yieldable end 21 of spring arm 20 a bridge 34 may be provided having a slot 36 in its top wall 37, best shown in FIG. 4. The top wall 37 slopes toward the forward end of the handle to form a wedge-shaped tunnel. A locking member in the form of a tapered slide bolt 38 increasing in thickness from front to rear is disposed for longitudinal sliding movement within the tunnel 37. An arm 40 projects upwardly from the slide bolt 38 and terminates in a finger piece 42. The slide bolt 38 when in its forward position (full line, FIG. 5) obstructs outward flexing movement of the yieldable end portion 21 spring arm 20 in response to turning movement of the tang 23 and consequently positively locks the knife blade 14 against inswing movement and collapse. When it is desired after use to collapse and fold the blade into the handle the slide bolt 38 is drawn rearwardly (dotted lines, FIG. 5), thereby permitting the yieldable end portion 21 to flex outwardly. The slide bolt can be returned to its locking position after the knife blade 14 has been closed into the handle 12, thereby to prevent outward flexing of the yieldable end portion 21 and thus positively to lock the knife blade against outward displacement from its closed position. Although a specific locking structure somewhat similar in certain respects to that shown in U.S. Pat. No. 3,728,984 issued to J. Hopta on Jan. 3, 1956 has been shown and described it will of course be understood that in accordance with the broader aspects of the invention any suitable or desirable latching mechanism which will retain the blade in its open position at an obtuse angle to the handle may be employed.

The shield 16 is independently swingable relative to the blade 14 but is spring urged into frictional engagement with the lateral surfaces thereof. Thus open outward swinging the blade 14 and shield 16 move together with the blade 14 nested between the side walls of the shield 16. As best shown in FIGS. 4 and 6 in accordance with a more specific aspect of the invention the blade 14 and shield 16 may include longitudinally extending concavities along their lateral surfaces. When the blade 14 is nested between the side walls of the shield 16 these concavities merge into smooth concave lateral surface. When the scraping edge 27 is employed to remove the fillet the concave surface causes the meat to roll away from the skeleton and skin of the fish producing a plowing effect. The concavity 17 at the free end of the shield 16 merges with the pointed end of the blade 14 to minimize the sharp point. This reduces risk of injury to the user. It also tends to prevent the bones of the rib cage from being cut when the fillet is removed, thereby assuring a boneless fillet.

This knife may be utilized in a procedure for filleting fish similar to the method disclosed in U.S. Pat. No. 3,820,196 issued June 28, 1974 to M.C. Penman. The fish is laid on a flat surface. The shield 16 is pivoted to the nested position within the handle 12 and the sharp cutting edge 25 of the blade is exposed. An incision is made in the fish from the back of the head along the dorsal fin to the tail with the cut going down to the rib cage. At the end of the rib cage the incision is continued through the body of the fish from dorsal fin to belly and thence to the tail and out through the skin. The fish is turned over and a similar incision is made on the other side of the dorsal fin. Thereupon the shield 16 is swung to a position with the sharp edge of the blade nested therein. The tool 10 is inserted in the cut at the back of the head and the meat is scraped away from the rib cage with the scraping edge 27 of the blade. The scraping edge 27 is worked along the rib cage and the skin out to the tail producing a boned, skin-free fillet. The fish is then turned over and the plow-like scraping action is repeated on the other side.

It will now be apparent that a unique, self-contained, portable tool for filleting fish has been provided which minimizes risk of injury to the user, which is simple and convenient to use and carry, and which is bio-mechanically efficient.

Although a specific embodiment of the invention has been described for the purpose of illustration it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. A portable, foldable tool for filleting fish comprising a handle, a dual purpose blade, sharpened to a cutting edge along one longitudinal edge and a shield for said blade, said shield being nestable in said handle, said blade being nestable in said shield having the other longitudinal edge exposed when in nested position, said blade and said shield being mounted on said handle about a transverse axis for independent pivotal movement from a position nested within said handle to operative position; wherein said other longitudinal edge is tapered to a scraping edge, blunt relative to said cutting edge, said shield completely covering said cutting edge in nested position with said blade and being of generally U-shaped in transverse cross section, the web of the U being closed over its entire length having a concave curvature at its free end having sharp edges at the junction with their lateral surfaces to serve as shears to remove the fillet from the rib cage merging with the free end of said blade when said blade is nested in said shield to form a combined end curvature substantially conforming to the curvature of the rib cage of a fish.

2. A portable, foldable tool for filleting fish according to claim 1 wherein the exposed lateral surfaces of said blade and said shield on both sides thereof merge into a combined smooth concave lateral surface on each side, the axis of the concavities extending in the longitudinal direction of the blade and shield.

3. A portable, foldable tool for filleting fish according to claim 1 wherein said shield is spring urged into frictional engagement with said blade when said blade is fully nested in said shield whereby said shield is prevented from inadvertently pivoting to a position outswung from the blade to expose the cutting edge.

4. A portable, foldable tool for filleting fish according to claim 1 wherein said blade and said shield extend from said handle at an obtuse angle in fully open position.

5. A portable, foldable tool for filleting fish according to claim 4 including manually releasable latching means for latching said blade in fully open position and in fully closed position.

* * * * *